United States Patent [19]

Niwano et al.

[11] Patent Number: 4,746,521

[45] Date of Patent: May 24, 1988

[54] METHOD OF MANUFACTURING A FOOD CONTAINING SOYBEAN PROTEIN ISOLATE

[75] Inventors: Shichiro Niwano, Nishinomiya; Norihumi Idomoto, Nabari, both of Japan

[73] Assignee: Tajimaya Food Company, Ltd., Itami, Japan

[21] Appl. No.: 20,769

[22] Filed: Mar. 2, 1987

[30] Foreign Application Priority Data

Mar. 1, 1986 [JP] Japan ................... 61-44550

[51] Int. Cl.$^4$ .......................... A21D 2/26; A23L 1/20
[52] U.S. Cl. .................................. 426/241; 426/656; 426/559
[58] Field of Search ............... 426/242, 243, 241, 551, 426/559, 553, 656, 634

[56] References Cited

U.S. PATENT DOCUMENTS 3,888,996  6/1975  Turro et al. .................... 426/551
4,396,635  8/1983  Roudebush et al. ............... 426/243
4,419,374  12/1983  Pei ........................ 426/243

OTHER PUBLICATIONS

Ranhotra et al., Breadmaking Characteristics of Wheat Flour Fortified with Various Commercial Soy Protein Products, Cereal Chemistry, vol. 51, 1974, pp. 629–634.

Primary Examiner—Raymond N. Jones
Assistant Examiner—Mary S. Mims
Attorney, Agent, or Firm—Finnegan, Henderson, Farabow, Garrett & Dunner

[57] ABSTRACT

A puffed food product is produced by adding to 100 parts by weight of a mixture comprising a soybean protein isolate and wheat flour in a mixture ratio of 40 to 60:60 to 40 (weight ratio) a mixture containing 10 to 30 parts by weight of at least either one of egg white or whole egg and 0.2 to 3 parts by weight of an expanding agent, and heat treating the mixture by microwave radiation under air blow.

6 Claims, No Drawings

METHOD OF MANUFACTURING A FOOD CONTAINING SOYBEAN PROTEIN ISOLATE

BACKGROUND OF THE INVENTION

[Technical Field]

This invention relates to a method of manufacturing a puffed food, i.e. a food expanded by leavening, More particularly, the invention relates to a method of manufacturing a puffed food containing soybean protein to a high degree.

[Prior Art]

Hitherto, it has been widely known to manufacture puffed foods, such as breads, cookies, and cakes, by heating or baking a mixture including starch or cereal flour, such as wheat flour, as a main ingredient.

Recently, people are increasingly becoming interested in varieties of health food in the light of various troubles arising from habitual overeating of animal foods. In view of such trend and further of the recent aggravation of the world food situation, utilization of vegetable protein as a protein source has been seriously considered. Among various vegetable proteins, soybean protein is most useful for this purpose, because it is in far much larger production than others, and because it has an exceedingly better balance of essential amino acids and is of high nutritive value. Therefore, if soybean protein could be effectively utilized as a food ingredient, it would provide an excellent protein food which could substitute proteins obtainable from such domestic animal meats as beef and pork. From this point of view, attempts have been made to develop foods containing soybean protein to a high degree, and as a link of such efforts, possibilities of developing a puffed food have been studied. However, if a puffed food is produced from a mixture containing soybean portein as the only main ingredient, it lacks flavor or the ike and is thus far from meeting the requirement of tastefulness for a food. Therefore, the possibility of using as a principal ingredient a mixture of a cereal flour, such as wheat flour, and/or starch with soybean protein has been considered. However, in a conventional dough consisting of 100 parts by weight of hard flour, 2.5 parts by weight of yeast, 0.15 part by weight of yeast food, 5 parts by weight of refined white sugar, 2 parts by weight of common salt, 5 parts by weight of shortening, 2 parts by weight of dried skim milk, and 65 parts by weight of water, for example, a mere substitution of a soybean protein isolate for only a 10 wt.% portion of the 100 parts by weight of hard flour would result in too much stiffness of the dough and insufficient rollability thereof, the fermentation activity of the yeast being thus unfavorably affected. Further, when the dough is baked, the resulting bread would be an unsatisfactorily puffed one and would lack flavor and delicacy. Indeed, such bread could hardly meet the requirement of tastiness for a commercial food. As such, the prior-art attempts have not been successful in obtaining a puffed food containing a high proportion of a soybean protein isolate.

SUMMARY OF THE INVENTION

Accordingly, an object of this invention is to provide a method of manufacturing a puffed food containing a soybean protein. More particularly, the object of the invention is to provide a method of manufacturing various forms of puffed food which contain a high proportion of soybean protein and which have good flavor and tastiness.

This invention, completed as a result of an extensive research conducted by the present inventors in view of aforesaid difficulties with the prior-art attempts and for the purpose of manufacturing a tasty puffed food having a high concentration of a vegetable protein, provides a method of manufacturing a puffed food, which comprises adding to 100 parts by weight of a mixture comprising a soybean protein isolate and wheat flour in a mixture ratio of 40 to 60:60 to 40 (weight ratio) a mixture containing 10 to 30 parts by weight of at least either one of egg-white or whole egg and 0.2 to 3 parts by weight of an expanding, i.e. leavening, agent, and heat-treating the resulting mixture by microwave radiation under air blow.

DETAILED DESCRIPTION OF THE INVENTION

Any commercially available soybean protein isolate may be used as a raw material soybean protein isolate in the method of the invention. For example, a soybean protein isolate in powder form (with a solid content of about 94% by weight and a protein content of about 86% by weight) may be used. A bean curd so called "tofu" may substitute wholly or in part for the soybean protein isolate. The bean curd may be either of a coarse or cotton strained type (with a solid content of 13.2% by weight) or of a fine or silk strained type (with a solid content of 10.6% by weight). As the proportion of the bean curd is increased relative to the soybean protein isolate, it is possible to obtain a puffed food like a cake having a relatively low degree of puffing. For the flour ingredient, a conventional type of wheat flour may be used.

According to the invention, at least egg-white or whole egg is added to a mixture of aforesaid soybean protein isolate and wheat flour. The egg-white and whole egg may be used in combination. For the egg ingredient, chicken eggs are normally used, but it is to be understood that such ingredient is not limited to chicken eggs. Further, for the egg ingredient, egg-white or whole egg or a mixture thereof may be suitably selected in consideration of various factors, such as the desired composition, shape of the puffed food, foaming characteristics of egg-white, and emulsifiability of egg yolk.

For puffing purposes, any type of expanding agent which has been conventionally used in the production of puffed foods may be used. Expanding agents useful in the method of the invention include, for example, baking powder, i.e., a mixture of a gas generating material (such as sodium bicarbonate) and an acidic material, sodium bicarbonate, ammonium bicarbonate, and ammonium carbonate. Especially, baking powder is preferred.

Aforesaid materials are mixed in the following proportions: 10 to 30 parts by weight of at least either one of egg-white or whole egg and 0.2 to 3 parts by weight of an expanding agent are added to 100 parts by weight of a mixture comprising the soybean protein isolate and wheat flour in a mixture ratio of 40 to 60:60 to 40 (weight ratio). Water may be added to the resulting mixture, in which case the proportion of water should be up to 80 parts by weight relative to 100 parts by weight of the soybean protein isolate.

For the purpose of such mixing, the relative proportions of the soybean protein isolate and the wheat flour may be suitably selected within the proportional ranges of 40 to 60:60 to 40 (in weight ratio). If the proportion of the soybean protein isolate in the mixture is in excess of 60% by weight, the resulting food would be of rather poor flavor, it being thus unable to obtain a puffed food having the desired taste. If the proportion is less than 40% by weight, the resulting food has no sufficient protein content, it being thus unable to obtain a nutritionally well balanced food. In either case, the objective of the invention cannot be accomplished. At least either one of egg-white or whole egg is added in 10 to 30 parts by weight to 100 parts by weight of the mixture of soybean protein isolate and wheat flour. Such egg ingredient(s) may be added in a proportion of up to 60 parts by weight. If the proportion of the egg ingredient is less than 10 parts by weight relative to 100 parts by weight of aforesaid mixture, no sufficient degree of puffing can be obtained. If the egg ingredient is added in excess of 60 parts by weight, an excessively puffed food is produced which is naturally excessively brittle. The proportion of the expanding agent to be added may be suitably selected according to the desired degree of puffing for the food.

According to the method of the invention for the manufacture of the puffed food, certain other kinds of materials may be used for admixture with aforesaid ingredients. For example, oils may be added depending upon the desired shape and/or balance of nutritive values for the puffed food. They may be either vegetable or animal, but vegetable oils are preferred. Among vegetable oils useful for the purpose are soybean oil, rapeseed oil, corn oil, cottonseed oil, palm oil, rice-bran oil, safflower oil, and sesame oil. Besides, beef tallow, lard, butter, and margarine may be used. These vegetable and animal oils may be used in combination as desired. Such oil ingredient is usually added in not more than 30 parts by weight relative to 100 parts by weight of the mixture of soybean protein isolate and wheat flour. Through addition of such oil ingredient it is possible to provide improved flavor and/or taste.

Further, for example, any of the following materials may be added as desired: polysaccharides, such as bean curd refuse, mashed potatoes, starch, and glucan; vegetable proteins other than soybean protein, such as wheat protein; cereals, such as rice, wheat, barley, and corn; potatoes, sweet potatoes, young taros; seeds and nuts, such as almond, hempseed, perilla seed, cashew nut, pumpkin seed, kaya nut, ginkgo nut, chestnut, walnut, coconut, pistachio nut, hazel nut, pine nut, and peanut; rice bran, wheat bran; sea weeds, vegetables, mushrooms; sea foods, such as shrimp, octopus, shellfish, fish meat and fishmeal; meats, such as beef, mutton, pork, and chicken; and animal bones. These materials may be added in crushed or ground form and usually in a proportion of up to 10 wt.% relative to the total weight of solid content of the material mixture.

Also, additives which are conventionally used in this field, for example, seasonings, such as salt, monosodium glutamate, sodium inosinate, sodium guanylate, and sugar, and other additives, such as coloring additive and sizing materials, and the like, may be added as desired.

A mixture incorporating any desired proportions of aforesaid materials mixed according to the desired recipe is conditioned preferably to a solid content of 30 to 55% by weight. The mixture so prepared is then subjected to microwave heat treatment. The mixture need not particularly be aged on the occasion of this microwave heat treatment. The mixture may be just formed into any desired shape as it is and then heat treated by microwave. Microwave heat treatment is carried out by irradiating the mixture with microwave. As the moisture in the mixture is evaporated by microwave irradiation, the process of puffing progresses and thus a puffed foodstuff is produced.

The frequency of microwaves for use is not particularly limited, but usually microwaves within a frequency range of 13 MHz to 18,000 MHz are utilized. Electric power for the microwave may be selected within a suitable range according to factors such as the water content of the mixture and irradiation time.

On the occasion of aforesaid microwave irradiation, it is essential that the microwave heating should be effected under air blow, i.e. under air flow, in order to prevent possible frosting, i.e. condensation, of the evaporated water on the walls of the irradiation chamber and to permit efficient evaporation of the water. The amount of air blow may be suitably selected according to the amount of the material mixture to be treated or otherwise. There is no particular limitation as to the temperature of blow air, but generally an air temperature range of 70° to 110° C. is preferred as it assures more efficient heat treatment.

Microwave irradiation may be carried out either on a batch system or on a continuous system. A rotary table type arrangement with a blower may be employed. In order to permit uniform heating in both upper and lower zones, it is desirable that the material mixture be microwave heat treated on a mesh or mesh belt comprising of a material which is highly capable of transmitting microwaves, for example, a Teflon-coated glass fiber or reinforced plastic.

A preferred mode of microwave heat treatment is such that the energy of the microwave with which the material mixture is irradiated is varied with time, whereby dehydration and puffing are effected. For example, the method in accordance with the invention employs a microwave radiation apparatus which comprises a plurality of successive chambers arranged so that the energy of the microwave radiation in a first chamber or second chamber is most powerful, with such energy becoming sequentially smaller in the other chambers. The material mixture is passed through the plurality of chambers, beginning from the first chamber, whereby a larger proportion of the water content is first evaporated, the energy of microwave irradiation being then adjusted according to the degree of puffing being effected.

Puffed foods which can be produced in accordance with the invention described above are of cake, bread, cookie, and the like forms, with puffing factors ranging from two to eight times and a solid content of 55 to 90%. The invention is therefore effectively applicable in various fields, such as snacks, confectionaries, and food materials.

The method of manufacturing the puffed food according to the invention has a number of advantageous features. For example, the use of microwave heat treatment permits almost simultaneous and uniform heating of both the interior and the surface. Thus, it is possible to obtain a highly puffed and uniform quality product. Microwave heat treatment can have good sterilization effect and, therefore, the puffed product, after baked, can be eaten as such. Furthermore, since puffed foods produced in accordance with the invention use as a basic material the soybean protein isolate having a large protein content, they naturally contain soybean protein to a large degree and has a high nutritive value; they also meet the requirement of flavor and tastiness for good food. In addition, the fact that foods produced in accordance with the invention have a solid content of 80 to 90 wt.% means an advantage of good preservability, and further water content and starch content of the foods are low enough to prevent a senescence phenomenon of the foods, as a result the foods can maintain good taste for long time.

about 40 wt.% and was found satisfactory in both flavor and taste.

Again, as Examples 2 to 4, homogeneous mixtures of materials shown in the following table were respectively subjected to microwave heat treatment in the same apparatus as employed in Example 1 and under such conditions as shown in the table.

Products thus obtained were all found excellent is both flavor and taste.

TABLE

|  |  | Example 2 | Example 3 | Example 4 | Example 5 | Example 6 |
|---|---|---|---|---|---|---|
| Material (in wt. parts) | Soybean protein isolate | 40 | 50 | 25 | 5 |  |
|  | Bean curd |  |  | 25 | 45 | 60 |
|  | Wheat flour | 60 | 50 | 50 | 50 | 40 |
|  | Egg white |  | 15 | 15 | 30 |  |
|  | Egg yolk |  | 15 |  | 30 |  |
|  | Whole egg | 10 |  | 15 |  | 30 |
|  | Oil | 20*1 |  | 30*3 | 20*4 | 10*5 |
|  | Expanding agent | 0.5 | 2.5 | 1 | 1 | 2 |
|  | Water | 70 | 90 | 10 |  | 30 |
|  | Other | 5*2 | Common salt 0.5 | Common salt 0.5 Wheat protein 5 |  | 5*6 |
| Conditions | Air temperature (°C.) | 90 | 110 | 110 | 100 | 100 |
|  | Microwave treat time (second) | 100 | 180 | 180 | 90 | 90 |
| Product | Form | Cookie-like | Bread-like | Bread-like | Cake-like | Cake-like |
|  | Factor of puffing (times) | 2.5 | 7.0 | 7.5 | 3.5 | 3.5 |
|  | Solid content (%) | 88.7 | 75.4 | 79.5 | 58.5 | 67.2 |

*1Corn oil used.
*2Bean curd refuse used.
*3Peanut oil used.
*4Soybean oil used.
*5Margarine used.
*6Sliced almond used.

[EXAMPLE]

The invention is described in further detail with reference to Examples given below. It is to be understood, however, that the invention is not limited by these Examples.

EXAMPLE 1

Ten parts by weight of egg-white, 5 parts by weight of butter, 0.2 part by weight of baking powder, and 80 parts by weight of water were placed into a mixer kneader and the mixture was uniformly mixed. To the mixture were added 60 parts by weight of a soybean protein isolate and 40 parts by weight of wheat flour, and the resulting mixture was kneaded well. The dough thus obtained (with a solid content of 54.5 wt.%) was immediately formed into a shape having a diametral thickness of 10 to 12 mm, which was then cut into pieces each having a length of 50 mm. The cut pieces were arranged on a Teflon mesh belt having a width of 280 mm.

A microwave irradiation apparatus having three successive chambers (with a total length of 4 m and a frequency of 2450 MHz; 2.6 Kw for a first chamber, 5.2 Kw for a second chamber, and 2.5 Kw for a third chamber) was employed for heat treatment, in which the dough pieces arranged on the mesh belt were passed through the chambers in sequence, beginning from the first chamber, under a blow air temperature of 70° C., being thereby subjected to microwave heat treatment for 120 sec. As a result, pieces of a cookie-like produce (with a solid content of 89 wt.%) having a puffing factor of 2.7 times. The product had a protein content of

What is claimed is:

1. A method of manufacturing a food which comprises adding to 100 parts by weight of a mixture comprising a soybean protein isolate and wheat flour in a weight ratio of 40 to 60:60 to 40, a mixture containing one or both of 10 to 30 parts by weight of egg white and 10 to 30 parts by weight of whole egg, and 0.2 to 3 parts by weight of a leavening agent, and heating the mixture in an irradiation chamber at a suitable microwave frequency under air flow, said air being at a temperature sufficient to permit efficient evaporation of water and to prevent condensation of the evaporated water on the walls of the irradiation chamber.

2. The method of manufacturing a food as claimed in claim 1, wherein the air temperature is from 70° to 110° C.

3. The method of manufacturing a food as claimed in claim 2, wherein 10 to 30 parts by weight of an oil is added to 100 parts by weight of said mixture of soybean protein isolate and wheat flour.

4. The method of manufacturing a food as claimed in claim 2 or 3, wherein the total amount of egg white, whole egg and mixture thereof added to 100 parts by weight of said mixture of soybean protein isolate and wheat flour is 10 to 30 parts by weight.

5. The method of manufacturing a food as claimed in claim 3, wherein the soybean protein isolate contains a bean curd.

6. The method of manufacturing a food as claimed in claim 4, wherein the microwave energy with which the mixture is irradiated is varied during said heating.

* * * * *